United States Patent [19]

Scott

[11] Patent Number: 4,660,437

[45] Date of Patent: Apr. 28, 1987

[54] DIFFERENTIAL GEAR BOX

[75] Inventor: Craig H. Scott, Rockford, Ill.

[73] Assignee: Sundstrand Corporation, Rockford, Ill.

[21] Appl. No.: 763,281

[22] Filed: Aug. 7, 1985

[51] Int. Cl.⁴ .................... F16H 37/06; F16H 37/00
[52] U.S. Cl. ........................... 74/675; 74/679; 74/714; 74/766; 416/152; 416/170 R; 416/160
[58] Field of Search ............ 74/714, 766, 675, 665 A, 74/665 B, 665 C, 665 D, 665 E, 679; 416/152, 170, 160

[56] References Cited

U.S. PATENT DOCUMENTS

| | | | |
|---|---|---|---|
| 1,596,511 | 8/1926 | Pistolesi | 416/160 |
| 1,986,229 | 1/1935 | Stanley | 170/163 |
| 2,020,366 | 8/1934 | MacCallum | 170/163 |
| 2,127,687 | 8/1938 | Heath | 170/163 |
| 2,224,640 | 12/1940 | Bonawit | 170/163 |
| 2,370,675 | 3/1945 | McCoy | 74/675 |
| 2,417,176 | 3/1947 | Ratie | 170/163 |
| 2,491,260 | 12/1949 | Green | 170/160.25 |
| 3,255,825 | 6/1966 | Mouille et al. | 170/135.75 |
| 3,448,946 | 6/1969 | Nagatsu | 244/17.19 |
| 3,469,886 | 9/1969 | Marberg | 175/173 |
| 3,603,697 | 9/1971 | Lane | 416/33 |
| 3,647,320 | 3/1972 | Chilman et al. | 416/160 |
| 3,818,775 | 6/1974 | Zeiger et al. | 74/675 |

Primary Examiner—Leslie Braun
Assistant Examiner—Martin G. Belisario
Attorney, Agent, or Firm—Wood, Dalton, Phillips, Mason & Rowe

[57] ABSTRACT

An apparatus for controlling pitch variations of the blades of a propeller. A first planetary gearset includes a sun gear, a ring gear and at least one planetary gear meshed with the sun and ring gears, the sun gear being statically grounded. A second planetary gearset is stacked in concentric juxtaposition with the first planetary gearset and includes a sun gear, a ring gear and at least one planetary gear meshed with the sun and ring gears. The planetary gears of the respective gear sets are coupled for conjoint orbiting about their respective sun gears. A main rotor drive input is coupled to the ring gear of the second planetary gearset. A blade actuator output is coupled to the ring gear of the first planetary gearset to be rotated thereby. A selectively operable differential drive input is coupled to the sun gear of the second planetary gearset, whereby inoperation of the differential drive input effectively grounds the sun gear and permits the main rotor drive input and the blade actuator output to rotate at the same speed. Selective operation of the differential drive input to rotate the sun gear of the second planetary gearset effects a differential speed between the rotor drive input and the blade actuator output.

6 Claims, 2 Drawing Figures 4,660,437

DIFFERENTIAL GEAR BOX

FIELD OF THE INVENTION

This invention relates to differential gear means and, particularly, to a differential gear box for use in controlling pitch variations of the blades of a propeller, for instance.

BACKGROUND OF THE INVENTION

Various apparatus are used in the drive and control mechanisms for the rotors of aircraft, including helicopter type aircraft, for varying the pitch or angle of attack of the blades of a propeller to control lift or to control horizontal flight. Conventionally, the blades are controlled so that all blades change pitch simultaneously to assume various angles corresponding to the control desired. Controlling and varying the propeller pitch most often is accomplished through a gear train including differential gear means. The gear train normally drives the main rotor for the propeller, and variable gear means are drivingly coupled to the propeller blades for varying the pitch thereof. Heretofore, such gear trains often have employed one or more planetary gearsets employing various auxiliary gears for varying the blade pitch. Such apparatus have been cumbersome and require an exorbitant amount of space.

For instance, in U.S. Pat. Nos. 1,596,511 and 1,986,229 to Pistolesi and Stanley, dated Aug. 17, 1926 and Jan. 1, 1935, respectively, the variable input is through the outside ring gears of a planetary gearset arrangement, including auxiliary gear means disposed completely outside the bounds of the planetary gear arrangement.

In other such systems for controlling or varying propeller pitch, the variable drive input is to the planetary gears or planetary gear carriers of the gearsets, again requiring cumbersome mechanics for coupling the gearsets and the drive train outside the bounds of the planetary gearsets. Examples of such systems are shown in U.S. Pat. Nos. 2,020,366 and 2,491,260 to MacCallum and Green, dated Nov. 12, 1935 and Dec. 13, 1949, respectively.

This invention is directed to solving the above problems by an unusual arrangement of gearing that allows the differential speed variations to take place in a much more compact space with less number of gears by stacking two planetary gearsets in juxtaposition, with no additional differential gearset other than the main, required output gearset.

SUMMARY OF THE INVENTION

An object, therefore, of the invention is to provide a new and improved differential gear means, such as that incorporated in a differential gear box for the rotor drive of an aircraft and for controlling pitch variations of the blades of a propeller.

In the exemplary embodiment of the invention, a first planetary gearset is provided and includes a sun gear, a ring gear and at least one planetary gear meshed with the sun and ring gears. The sun gear of the first planetary gearset is statically grounded. A second planetary gearset is provided and includes a sun gear, a ring gear and at least one planetary gear meshed with the sun and ring gears. The planetary gears of the two gearsets are coupled for conjoint orbiting about their respective sun gears. Preferably, the first and second planetary gearsets are stacked in concentric juxtaposition.

Main rotor drive input means are coupled to the ring gear of the second planetary gearset for rotating the same. Blade actuator output means are coupled to the ring gear of the first planetary gearset to be rotated thereby. Selectively operable differential drive input means are coupled to the sun gear of the second planetary gearset, whereby inoperation of the differential drive input means effectively grounds the sun gear of the second planetary gearset and permits the main rotor drive input means and the blade actuator output means to rotate at the same speed. However, selective operation of the differential drive input means to rotate the sun gear of the second planetary gearset effects a differential speed between the rotor drive input means and the blade actuator output means. The differential drive input means is operable in opposite modes for rotating the sun gear of the second planetary gearset in opposite directions to thereby increase or decrease the speed of the blade actuator output means from the main rotor drive input means.

The above described drive and control gearing arrangement allows for a very compact construction for varying the blade pitch in an aircraft, such as a helicopter. As disclosed herein, the main rotor drive input means and the blade actuator output means include concentric input shaft means and output shaft means, respectively, concentric with the first and second planetary gearsets. The input shaft means and the output shaft means are meshed with the ring gears of the second and first planetary gearsets, respectively. The input shaft means is cylindrical and is meshed on the interior thereof with the ring gear of the second planetary gearset. The main rotor drive input means include rotor drive gear means meshed with an annular gear on the outside of the cylindrical input shaft means. The output shaft means then can be disposed completely within the input shaft means. With such an arrangement, and with the first and second planetary gearsets stacked in concentric juxtaposition, the rotor drive input means and the blade actuator output means can be located on one axial side of the planetary gearsets, and the differential drive input means can be located on the opposite axial side of the planetary gearsets. Therefore, all of these components are substantially within the axial bounds of the gearsets resulting in a very simple and compact apparatus, quite contrary to the prior art wherein differential gearing is disposed separate from and outside the main required output gearset.

Other objects, features and advantages of the invention will be apparent from the following detailed description taken in connection with the accompanying drawings.

DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DESCRIPTION OF THE PREFERRED EMBODIMENT

Figure 1:
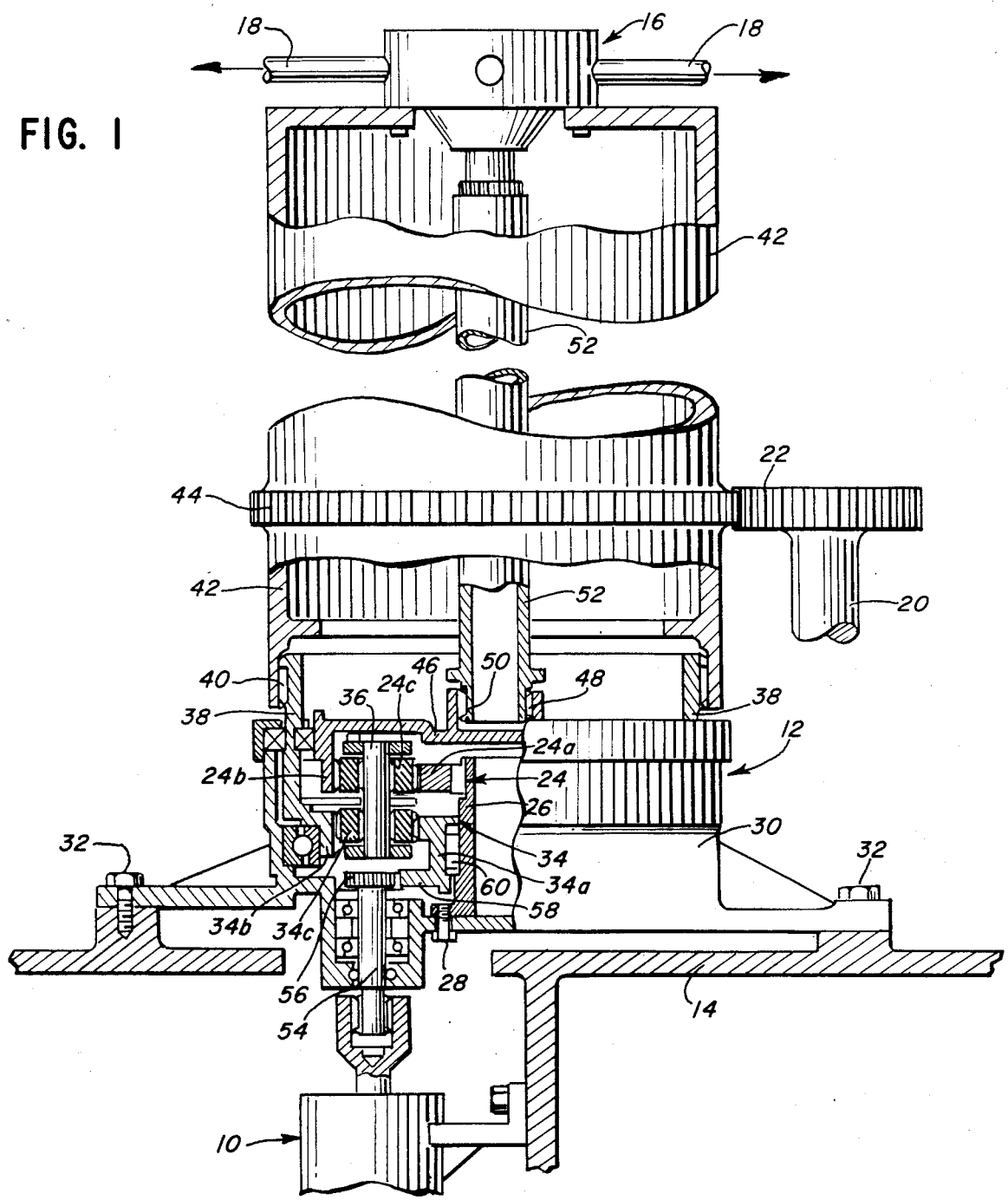
FIG. 1 is a fragmented, vertical central section through portions of the drive and actuation system of a helicopter, including the differential gear means of this invention.

Referring to the drawings in greater detail, and first to FIG. 1, the invention is illustrated for use in a blade pitch actuation system of a helicopter. The actuation system includes a static power drive unit, generally designated 10, and a lower gearbox, generally designated 12, both of which are mounted on the fuselage or airframe 14 of the helicopter. The lower gearbox provides the power drive which, in turn, delivers power to an upper gearbox, generally designated 16, and therefrom to rotor actuators, as at 18, which are spinning at main rotor speed. Upper gearbox 16 is a conventional right-angle gearbox to the blade actuators. A main rotor drive 20 is located concentric with the actuation system and includes a drive gear 22.

Generally, lower gearbox 12 must provide output speed only relative to the rotor speed when actuation is required. When power drive unit 10 is not operating, the lower gearbox output spins at the same speed as the main rotor. When the power drive unit is selectively actuated, the lower gearbox adds to or substracts speed from the output, thus providing a relative speed with reference to the rotor. Essentially, power drive input unit 10 comprises a selectively operable differential drive input means for the system.

Specifically, lower gearbox 12 includes a pair of planetary gearsets which are stacked in concentric juxtaposition. A first planetary gearset, generally designated 24, inlcudes a sun gear 24a, a ring gear 24b and at least one planetary gear 24c meshed with the sun and ring gears. The sun gear 24a is statically grounded to a center boss 26 secured by bolts 28 to a lower gear-box housing 30 which, in turn, is secured to airframe 14 by bolts 32.

A second planetary gearset, generally designated 34, includes a sun gear 34a, a ring gear 34b and at least one planetary gear 34c. Planetary gears 24c, 34c of the two planetary gearsets are coupled by carrier means 36 for conjoint orbiting about their respective sun gears.

Main rotor drive input means are coupled to ring gear 34b of second planetary gearset 34 for rotor rotation. More particularly, ring gear 34b has an integral, annular extension 38 which surrounds first planetary gearset 24. The annular extension is externally geared, as at 40, for meshing with the inside of a cylindrical main rotor input shaft 42, at the lower end of the cylindrical shaft. The upper end of the cylindrical shaft is fixed to upper gearbox 16 for rotating the helicopter rotor. Gear 22 of main engine rotor drive 20 is meshed with an annular gear 44 formed integrally with the outside of main rotor input shaft 42. Therefore, ring gear 34b of second planetary gearset 34 rotates at the same speed as the rotor and rotor drive.

Blade actuator output means are coupled to ring gear 24b of first planetary gearset 24 to be rotated thereby. More particularly, ring gear 24b has an integral, transverse extension 46 which projects inwardly on the upper side of the stacked planetary gearsets. Extension 46 has an internally geared boss 48 meshed with the outside of a lower distal end 50 of a gearbox output shaft 52. It immediately can be seen that gearbox output shaft 52 is located within and concentric with main rotor input shaft 42.

Selectively operable differential drive input means 10 is coupled to sun gear 34a of second planetary gearset 34 by means of a drive shaft 54 and a pinion gear 56 which is meshed with a gear section 58 of the sun gear. The sun gear is mounted by bearings 60 for free rotation about fixed boss 26.

Figure 2:
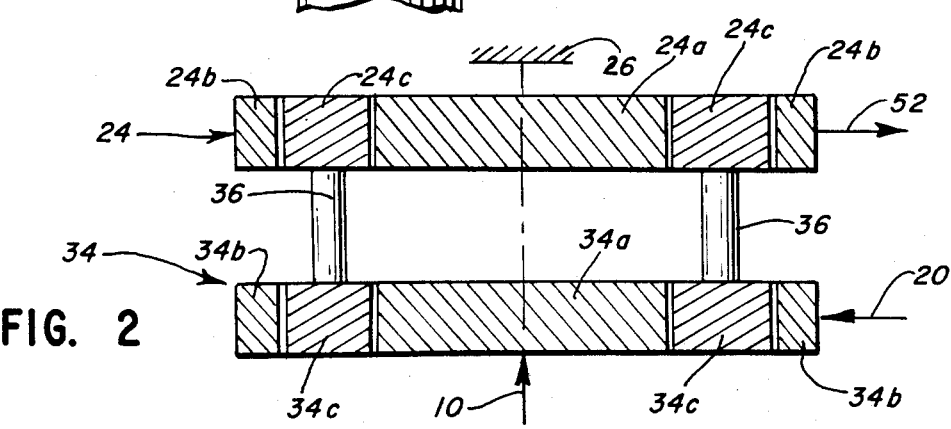
FIG. 2 is a somewhat schematic view, on an enlarged scale, of the pair of stacked, concentric planetary gearsets.

FIG. 2 illustrates somewhat schematically the components of the concentrically stacked first and second planetary gearsets 24 and 34, respectively. It can be seen that each gearset includes a plurality of planetary gears 24c coupled for respective conjoint rotation by a plurality of carriers 36. It can be seen that sun gear 24a is statically grounded, as at 26. Sun gear 34a of second planetary gearset 34 is coupled to the selectively operable differential drive input means, as indicated at 10. The main engine rotor drive is indicated coupled to ring gear 34b of second planetary gearset 34 by arrow 20. The gearbox output shaft is indicated coupled to ring gear 24b of first planetary gearset 24 by arrow 52. This schematic illustration will aid in understanding the following operation.

More particularly, when differential drive input means 10 is not operating (i.e. no actuation) sun gear 34a of second planetary gearset 34 effectively is statically grounded and, therefore, the rotor drive input means and the blade actuator output means, including main rotor input shaft 42 and gearbox output shaft 52, respectively, rotate at the same speed. When selectively operable differential drive input means 10 is actuated in either an "up" or "down" direction, a differential speed summing takes place to effect a differential speed actuation between the rotor drive input means, including main rotor input shaft 42, and the blade actuator output means, including gearbox output shaft 52. This effectively operates through upper, right-angle gearbox 16 to operate the blade actuators to vary the pitch thereof, as is known.

It can be seen that the system of this invention provides a significantly more compact construction than heretofore available. It can be seen that differential drive input means 10, main rotor input shaft means 42 and gearbox output shaft 52 all are located substantially within the bounds of the two planetary gearset constructions. The differential drive input simply is located on one axial side of the planetary gearsets and the rotor drive input means and the blade actuator output means are located on the opposite axial side of the planetary gearset. There are no differential gearsets or related components separate from and outside the main structure of the system as is prevalent with the prior art.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:
1. Apparatus for controlling pitch variations of the blades of a propeller, comprising:
   a first planetary gearset including a sun gear, a ring gear and at least one planetary gear meshed with the sun and ring gears, the sun gear being statically grounded;
   a second planetary gearset stacked in concentric juxtaposition with the first planetary gearset and including a sun gear, a ring gear and at least one planetary gear meshed with the sun and ring gears, the planetary gear being coupled for conjoint orbiting with the planetary gear of the first gearset;

main rotor drive input means including cylindrical input shaft means spaced entirely above and being of and concentric with the planetary gearsets, the input shaft means being meshed on the interior thereof with the ring gear of the second planetary gearset, and rotor drive gear means meshed with gear means on the outside of the cylindrical input shaft means;

blade actuator output means located entirely above the planetary gearsets and including output shaft means concentric with the planetary gearsets, the output shaft means being disposed within the cylindrical input shaft means and coupled to the ring gear of the first planetary gearset to be rotated thereby; and selectively operable differential drive input means located entirely below the planetary gearsets and coupled to the sun gear of the second planetary gearset, whereby inoperation of the differential drive input means effectively grounds the sun gear and permits the main rotor drive input means and the blade actuator output means to rotate at the same speed, and selective operation of the differential drive input means to rotate the sun gear of the second planetary gearset effects a differential speed between the rotor drive input means and the blade actuator output means.

2. The apparatus of claim 1 wherein the differential drive input means is operable in opposite modes for rotating the sun gear of the second planetary gearset in opposite directions to thereby increase or decrease the speed of the blade actuator output means from the main rotor drive input means.

3. The apparatus of claim 1 wherein the output shaft means are meshed with and rotatable by the ring gear of the first planetary gearset.

4. A differential gear system, comprising:
a first planetary gearset including a sun gear, a ring gear and at least one planetary gear meshed with the sun and ring gears, the sun gear being statically grounded;

a second planetary gearset stacked in concentric juxtaposition with the first planetary gearset and including a sun gear, a ring gear and at least one planetary gear meshed with the sun and ring gears, the planetary gear being coupled for conjoint orbiting with the planetary gear of the first gearset;

cylindrical input drive means spaced entirely above and being and concentric with the planetary gearsets, the input drive means being meshed on the interior thereof with the ring gear of the second planetary gearset, and rotor drive gear means meshed with gear means on the outside of the cylindrical input shaft means;

output means located entirely above the planetary gearsets and including output shaft means concentric with the planetary gearsets, the output shaft means being disposed within the cylindrical input drive means and coupled to the ring gear of the first planetary gearset to be rotated thereby; and selectively operable differential drive input means located entirely below the planetary gearsets and coupled to the sun gear of the second planetary gearset, whereby inoperation of the differential drive input means effectively grounds the sun gear and permits the input drive means and the output means to rotate at the same speed, and selective operation of the differential drive input means to rotate the sun gear of the second planetary gearset effects a differential speed between the input drive means and the output means.

5. The differential gear system of claim 4 wherein the differential drive input means is operable in opposite modes for rotating the sun gear of the second planetary gearset in opposite directions to thereby increase or decrease the speed of the output means from the input drive means.

6. The differential gear system of claim 4 wherein the output shaft means are meshed with and rotatable by the ring gear of the first planetary gearset.

* * * * *